(12) United States Patent
Peterson

(10) Patent No.: US 11,623,344 B2
(45) Date of Patent: Apr. 11, 2023

(54) SYSTEM AND METHOD FOR AUTONOMOUSLY DEFINING REGIONS OF INTEREST FOR A CONTAINER

(71) Applicant: AGR International, Inc., Butler, PA (US)

(72) Inventor: Jeffrey A. Peterson, Pittsburgh, PA (US)

(73) Assignee: AGR INTERNATIONAL, INC., Butler, PA (US)

( * ) Notice: Subject to any disclaimer, the term of this patent is extended or adjusted under 35 U.S.C. 154(b) by 0 days.

(21) Appl. No.: 16/854,220

(22) Filed: Apr. 21, 2020

(65) Prior Publication Data

US 2021/0107145 A1   Apr. 15, 2021

Related U.S. Application Data

(60) Provisional application No. 62/913,956, filed on Oct. 11, 2019.

(51) Int. Cl.
*B25J 9/16*   (2006.01)
*G06V 10/25*   (2022.01)

(52) U.S. Cl.
CPC ........... *B25J 9/1612* (2013.01); *B25J 9/1697* (2013.01); *G06V 10/25* (2022.01)

(58) Field of Classification Search
CPC ..... B25J 9/1612; B25J 9/1697; G06K 9/3233; G06T 7/0004; G06T 2207/30108; G01N 21/9054; G01N 21/90; B07C 5/126; B07C 5/3422; B07C 5/10; B65G 47/38; B65G 2201/0244; Y10S 209/934; Y10S 209/92; Y10S 209/91
See application file for complete search history.

(56) References Cited

U.S. PATENT DOCUMENTS

| | | | |
|---|---|---|---|
| 5,641,072 A * | 6/1997 | Otake | B07C 5/126 209/524 |
| 5,926,268 A * | 7/1999 | Bonewitz | G01N 21/21 356/240.1 |
| 8,941,825 B2 | 1/2015 | Juvinall et al. | |
| 9,183,633 B2 | 11/2015 | Yamada | |
| 10,163,210 B2 | 12/2018 | Kim | |
| 10,198,653 B2 | 2/2019 | Kotula | |
| 10,429,401 B2 | 10/2019 | Streibl et al. | |
| 2008/0273086 A1* | 11/2008 | Sones | G06T 7/0004 348/127 |

FOREIGN PATENT DOCUMENTS

WO   WO 2017/117566 A1   7/2017

* cited by examiner

*Primary Examiner* — Jianxun Yang
(74) *Attorney, Agent, or Firm* — K&L Gates LLP

(57) ABSTRACT

A system and method for autonomously defining regions of interest for a container are provided. The system comprises a platform for supporting the container, a detector for capturing feature data of the container while on the platform, and a computer system. The computer system is in communication with the detector and platform. The computer system is programmed to locate features of the container from the captured feature data, and define the regions of interest for the container based on the located features.

27 Claims, 10 Drawing Sheets

US 11,623,344 B2

SYSTEM AND METHOD FOR AUTONOMOUSLY DEFINING REGIONS OF INTEREST FOR A CONTAINER

PRIORITY CLAIM

The present application claims priority to U.S. provisional patent application Ser. No. 62/913,956, filed Oct. 11, 2019, which is incorporated herein by reference in its entirety.

BACKGROUND

During the manufacturing of containers, such as blow-molded or extruded containers, for example, dimensional variations of the containers can occur. Measuring the dimensions of the containers can be used for quality control of the containers to ensure the dimensional variations are within an acceptable range. One measurement technique involves the use of an image of the container, but there are challenges with determining measurements of containers from images.

SUMMARY

In one general aspect, the present invention is directed to systems and methods for determining regions of interest for a container. The system comprises a detector for capturing feature data of the container while on the platform and a computer system. The computer system is in communication with the detector and is programmed to locate features of the container from the captured feature data. In various examples, the features could be a horizontal center of the container, a vertical center of the container, a top of the container, a finish feature, a body feature, a shoulder feature, a heel feature. The computer system is further configured to define the regions of interest for the container based on the located features. In various examples, the computer system is programmed to determine dimensional measurements of the container from the identified features. In certain embodiments, the regions of interest and/or other features can be stored in a data store.

In another general aspect, the present invention is directed to vision-based systems and methods for determining regions of interest for a container. The system comprises a platform for supporting the container, a detector for capturing images of the container over time while on the platform, and a computer system. There is relative movement between the platform and the detector, such that images captured by the detector are of different container poses (position and orientation) relative to the detector. In an example, the platform can be configured to rotate about an axis and/or change elevation relative to the detector. The computer system is in communication with the detector and platform, and is programmed to identify edges of the container from the captured images, such as with chain code, raster scanning, Sobel edge detection, thresholding, and/or edge extraction. The computer system is programmed to locate features of the container on the identified edges from the captured images. In various examples, the features could be a horizontal center of the container, a vertical center of the container, a top of the container, a finish feature, a body feature, a shoulder feature, a heel feature. The computer system is further configured to define the regions of interest for the container based on the located features. In various examples, the computer system is programmed to determine dimensional measurements of the container from the identified features. In certain embodiments, the regions of interest and/or other features can be stored in a data store.

In various embodiments, the present disclosure provides a system and method for autonomously defining regions of interest for a container, which can improve the accuracy of dimensional measurements of the container and reduce the time required by an operator to configure a measurement for a new container design. The system and/or method of the present disclosure can be applied to identify the container before it is placed into a measurement system by adding a second sensor in order to configure any mechanical and/or software adjustments for optimum transport and measurement of the container autonomously. These and other benefits realizable through various embodiments of the present invention will be apparent from the description that follows.

BRIEF DESCRIPTION OF THE DRAWINGS

The features and advantages of the examples of the present invention, and the manner of attaining them, will become more apparent, and the examples will be better understood, by reference to the following description taken in conjunction with the accompanying drawings, which show by way of example various embodiments of the present invention.

Corresponding reference characters indicate corresponding parts throughout the several views. The exemplifications set out herein illustrate certain embodiments, in one form, and such exemplifications are not to be construed as limiting the scope of the appended claims in any manner.

DESCRIPTION

Figure 1:
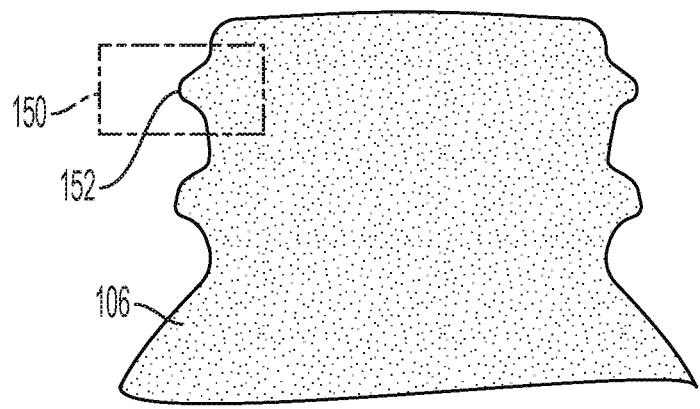
FIG. 1 is an image of a portion of a container comprising a first region of interest according to various embodiments of the present disclosure.

With reference to FIG. 1, a typical inspection system can require an operator to define a region of interest 150 of a container for where a feature is located and how to locate the feature within captured feature data of the container. For example, an operator may have to determine a left most point 152 on an edge of a container 106 (or a right most point (not shown)) within the region of interest 150 as illustrated in FIG. 1.

Figure 2:
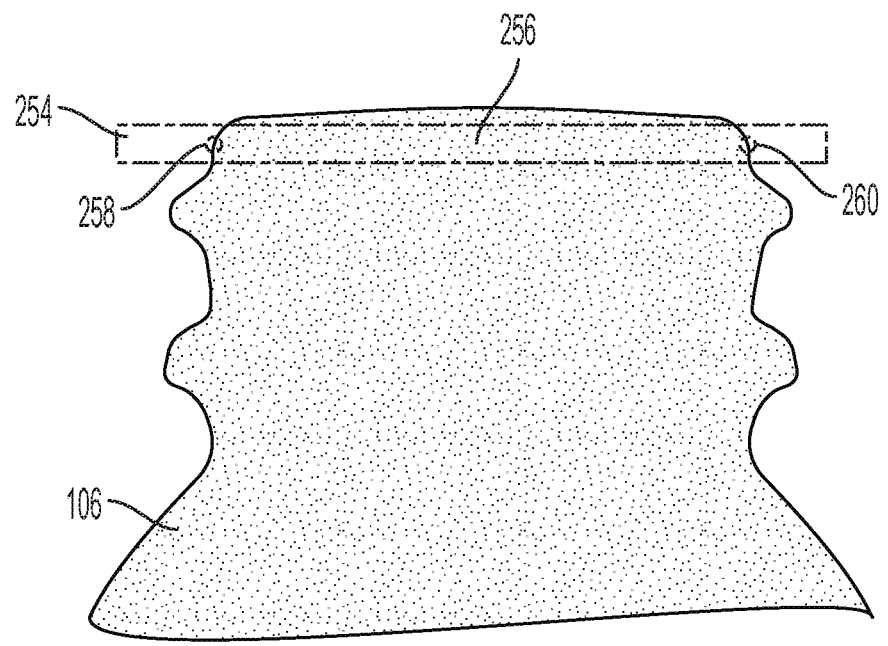
FIG. 2 is an image of a portion of a container comprising a second region of interest according to various embodiments of the present disclosure.

It can be challenging when, during the manufacturing and/or inspection process, the container 106 moves left or right within the field of view of a detector and therefore moves the location of the left most point 152 within a captured image and thus, the left most point 152 may not align with the region of interest 150. Therefore, the operator can take additional steps to setup another region of interest 254 as illustrated in FIG. 2 in order to determine where the region of interest 150 should be defined. For example, FIG. 1 and FIG. 2 can be considered to be images captured for the same container but the container is rotated in FIG. 2 relative to FIG. 1. A center 256 of the container 106 in FIG. 2 can be located by determining a left most point 258 and a right most point 260 of the container 106 within the region of interest 254 which can be defined above the threads of the finish region of the container 106. Thereafter, the operator references the region of interest 150 shown in FIG. 1 to the center 256 of the container 106 located within the region 254 of interest shown in FIG. 2 in order to locate the regions of interest in FIGS. 1 and 2 with respect to one another.

Figure 3:
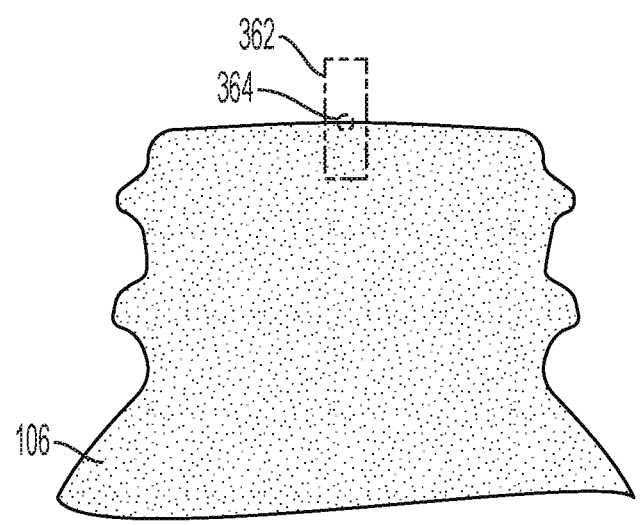
FIG. 3 is an image of a portion of a container comprising a third region of interest according to various embodiments of the present disclosure.

However, the container 106 can move vertically within the field of view of a detector and if the region of interest 254 at least partially includes a thread of the finish region of the container 106, the center 256 of the container 106 may be improperly defined. If the center 256 is improperly defined, the region of interest 150 may be improperly defined. Therefore, the operator additionally sets-up another region of interest 362 as illustrated in FIG. 3 (e.g., another image of the same container) to locate the top 364 of the container 106. The operator can reference the region of interest 254 shown in FIG. 2 to the top 364 of the container 106 within the region of interest 362 shown in FIG. 3 to locate the regions of interest in FIGS. 2 and 3 with respect to one another.

Typically, operators of a container manufacturing machine (e.g., a blow-molder or extrusion molder) enter various parameters into the control system/user interface of the container manufacturing machine to enable an inspection system for the manufactured containers to measure the dimensions of the container 106. Programming the various parameters and defining the regions of interest can be time consuming. Additionally, the rate of turnover of operators can lead to inexperienced operators using the inspection system and thus, parameters and regions of interest can be incorrectly configured which leads to incorrect measurements of the container 106.

Accordingly, the present disclosure provides a vision-based system for autonomously defining regions of interest for a container and a corresponding method for autonomously defining regions of interest for a container, which can improve the accuracy of the measurement of the feature of the container and reduce the time required by an operator to configure a measurement for a new container design.

Figure 4:
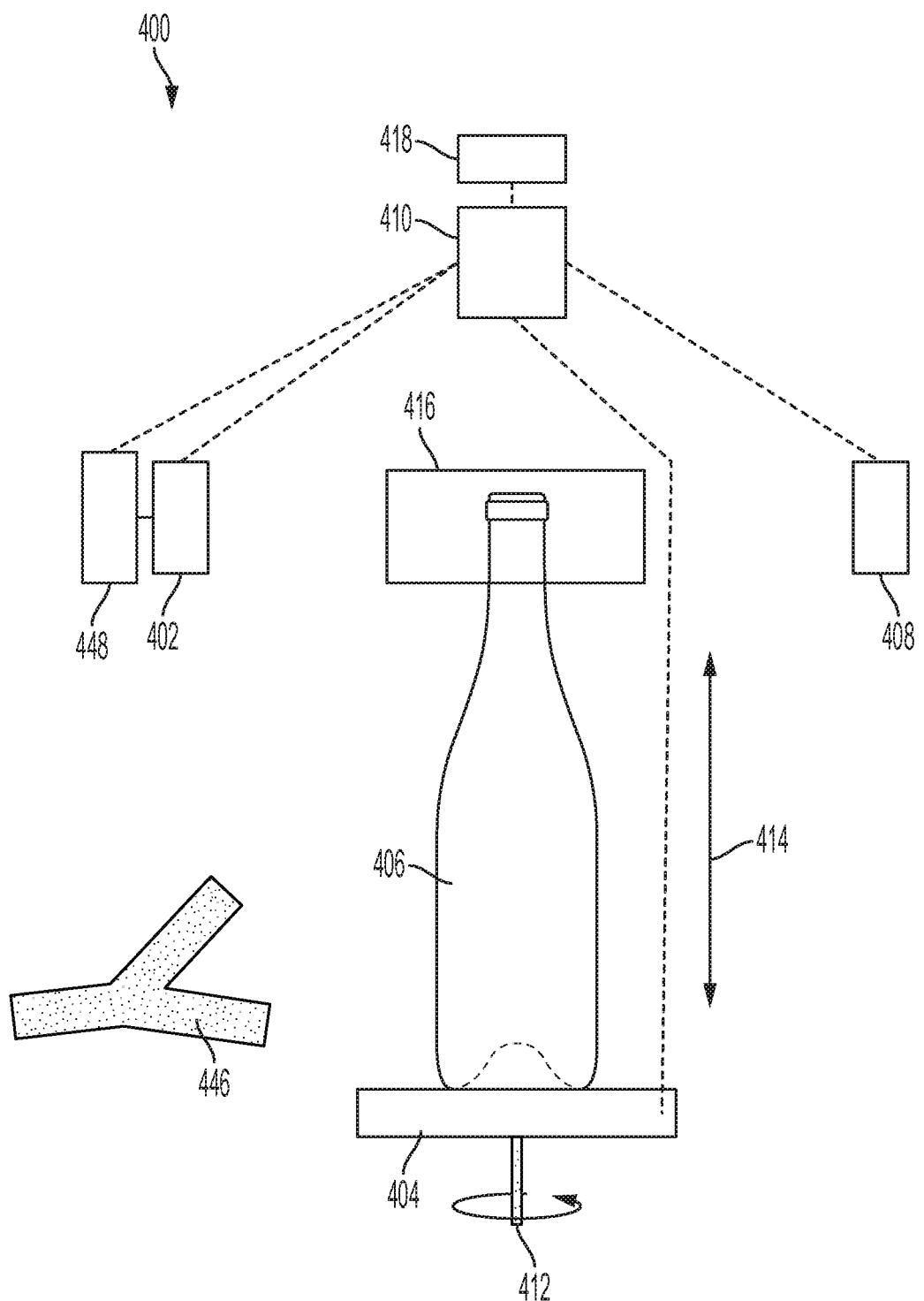
FIG. 4 is a block diagram illustrating a system for autonomously defining regions of interest for a container according to various embodiments of the present disclosure.

FIG. 4 shows a system 400 for determining regions of interest for a container 406 according to various embodiments of the present invention. The system 400 comprises a detector 402, a platform 404, a computer system 410, and optionally a light source 408 and a data store 418. The computer system 410 can be in communication with the detector 402, the platform 404, and the light source 408 via any suitable wired or wireless communication link, such as Ethernet cables, RS-232 cables, Bluetooth, etc. The computer system 410 may also be in data communication with the data store 418 (e.g., via a LAN). The platform 404 can be positioned intermediate the detector 402 and the light source 408. The detector 402 preferably is a camera with a field of view as described further below.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be immediately adjacent to or in contact with the first and/or second elements, and other elements may be disposed between the referenced element and the first and/or second elements.

The data store 418 is a repository for storing and managing data and can be implemented with a database (e.g., a relational database, a non-relational database) or other file storage type. For example, the data store 418 may comprise job files suitable to store data related to a particular container. For example, each job file may comprise dimensional measurements of the particular container (e.g., T, E, D, W, height, thickness, material), an image of a container, pass/fail thresholds for a particular dimension (e.g., maximum, minimum, range), system optimization parameters (e.g., light level, inspection speed, camera gain, spectral characteristics), communications/ data/commands (e.g., network, serial), bottle transport parameters (e.g., grip position, grip force, transport velocity), calibration parameters (e.g., vision, thickness, motion control), and other parameters. The data store 418 can be implemented with in-memory, distributed, federated, and/or cloud-based data stores, for example.

The container 406 can be at least one of a bottle, a jar, a jug, a bucket, a preform, and a vial. The container 406 can comprise various materials, such as, for example, plastic, metal and/or glass. The container 406 can be a blow molded container or other formed container.

The platform 404 can be configured for supporting the container 406. For example, the platform 404 can support the weight and/or position of the container 406. The platform 404 can be, for example, a turntable, a conveyor, an elevated rail, a robot gripper or other body. The platform 404 can be fixed in terms of position and orientation, or the platform 404 can be moveable with respect to the detector 402. For example, the platform 404 can be configured to rotate about an axis 412 and/or change elevation along direction 414 with respect to the detector 402 and the container 406 moves with the platform 404. In other embodiments, the container 406 is stationary on the platform 404 and the detector 402 moves. In either case, there is relative movement between the platform 404 (and the container 406) and the field of view of the detector 402.

The detector 402 can be configured to capture an feature data within a field of view 416 for the detector 402 and output the captured feature data to the computer system 410. For example, the detector 402 can capture feature data of the container 406 over time while on the platform 404 and can output the captured feature data of the container to the computer system 410. The field of view 416 can be at least a portion of the container 406 or the whole container 406 (not shown). The detector 402 can be at least one of a camera (e.g., CCD, CMOS, hyperspectral, Time of Flight), Infrared Sensor, spectrometer, confocal probe, LIDAR, thickness sensor, or other 3D point mapping device. In various embodiments where the detector 402 is a camera, the feature data can be an image. In some embodiments, the detector 402 can capture a single image or multiple images of the container 406 while on the platform 404 and output the captured image or images to the computer system 410.

In various embodiments, the detector 402 can comprise a thickness or other container material distribution sensor as described in U.S. Pat. No. 8,818,755, which is hereby incorporated by reference. In embodiments, where the detector 402 is a thickness sensor, the feature data can be a thickness value associated with a location. In other examples, the feature data can be a 3D point cloud or other 3D file. In various examples, the system 400 can comprise multiple detectors 402.

The detector 402 can be fixed or the detector 402 can be moveable with respect to the platform 404. For example, the detector 402 can be moveable by a robotic arm or other device such that the pose of the detector 402 can change relative to the platform 404. In various embodiments, the detector 402 can scan the container 406 vertically and/or circumferentially and store a linear profile of the container 406 substantially aligned with the axis 412 and/or a silhouette (2D or 3D) of the container 406 where the type of detector 402 is a confocal probe, LIDAR, Time of Flight device, a spectrometer, or similar device.

As illustrated, the computer system 410 can be configured in communication with a positioning control device 448 configured to change a pose of the detector 402 relative to the platform 404. The positioning control device 448 can move the detector in at least 3 degrees of freedom, such as, for example, along axis 412, along an axis perpendicular to axis 412, and a rotation about axis 412. The computer system 410 and positioning control device 448 can close the loop on the detector 402 for positioning the detector 402 in the optimal position for desired performance in measuring a linear profile and/or silhouette of the container 406. For example, the position of the detector 402 can be known based on the where it is positioned by the positioning control device 448. The output feature data from the detector 402 and position of detector 402 can be used by the computer system 410 to determine a property of the container 406 such as, for example, a 3D location of an area on a surface of a bottle, a thickness, and/or presence of a surface of a container 406 .

For ease of clarify, the detector 402 will be described in terms of a camera but it would be understood, the camera could include or be replaced by or additionally include other types of sensors, such an infrared sensor, a spectrometer, a confocal probe, a LIDAR sensor, a thickness sensor, or other 3D point mapping device. Referring back to FIG. 4, regardless of the configuration of the detector 402 and the platform 404, there can be relative movement between the platform 404 and the detector 402. Thus, images captured by the detector 402 can be of different container 406 poses (e.g., positions and/or orientations) relative to the detector 402. The images can be captured of the container 406 by rotating the container 406 about axis 412 in the field of view 416 of the detector 402 at a constant elevation. The images can be captured of the container 406 by changing the elevation of the container 406 along direction 414 relative to the detector 402 in the field of view 416 of the detector 402 while keeping the container 406 at a constant angle relative to axis 412. The images can be captured of the container 406 by changing the elevation of the container 406 along direction 414 relative to the detector 402 in the field of view 416 of the detector 402 and simultaneously rotating the container 406 about axis 412 in the field of view 416 of the detector 402.

The pose of the detector 402 relative to the platform 404 (and/or the pose of the platform 404 relative to the detector 402) of each captured image can be added as pose data to the respective image as metadata and/or stored in the data store 418. In various examples, each captured image may only capture a partial view of the container and at least two captured images can be combined into a single image based on the pose data and/or identified features as described herein.

The computer system 410 can be programmed to control the detector 402 (movement and/or image capture), the movement of the platform 404 (e.g., rotation and/or elevation), and/or the light source 408 (e.g., on/off, brightness, color). The computer system 410 can receive captured images from the detector 402 and the computer system 410 can be programmed to process the captured images.

Figure 5:
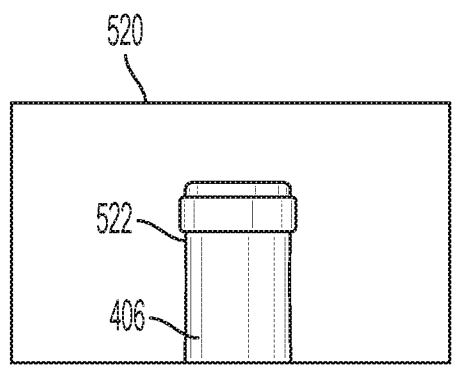
FIG. 5 is an image of a portion of a container according to various embodiments of the present disclosure.
Figure 6:
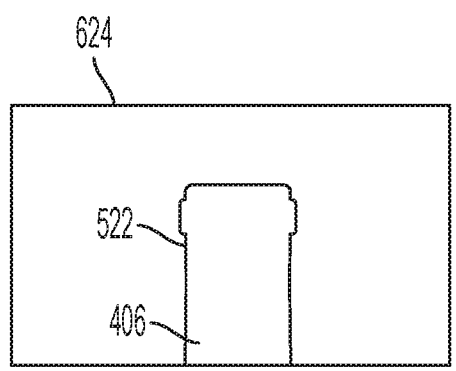
FIG. 6 is a silhouette image of a portion of a container according to various embodiments of the present disclosure.

For example, the detector 402 can capture an image 520 as illustrated in FIG. 5 and output captured image 520 to the computer system 410. The computer system 410 can receive the image 520 from the detector 402 and can process the image 520. For example, the computer system 410 can be programed to identify edges 522 of the container 406 from the captured image 520. The edges 522 of the container 406 can be identified based on a contrast change within pixels of the captured image 520 meeting and/or exceeding a threshold and/or and a change in lightness within the pixels of the captured image 520 meeting and/or exceeding a threshold. In various examples, the computer system 410 can be programmed to utilize at least one of chain code, raster scanning, Sobel edge detection, thresholding, and edge extraction to identify the edges. In certain examples, identifying the edges 522 of the container 406 can comprise transforming the captured image 520 into a silhouette image 624 as illustrated in FIG. 6. In various examples, the computer system 410 can be programmed further to smooth (e.g., remove pixel noise) the captured image 520 and/or silhouette image 624. In various examples, the computer system 410 can identify the edges 522 of the container 406 from a point cloud, computer design file (e.g., .step file), or other data type.

The computer system 410 can be programmed to locate features on the edges 522 from the silhouette image 624 and/or captured image 520. The features can, for example, be a horizontal center of the container 406, a vertical center of the container 406, a top of the container 406, a side (e.g., left side, right side) of the container 406, a bottom of the container 406, a finish feature of the container 406, a body feature of the container 406, a shoulder feature of the container 406, and/or a heel feature of the container 406. The finish feature can be a thread crest, a thread root, a support ledge edge, and a neck straight edge, for example.

The computer system 410 can be programmed to identify an edge angle for pixels along the edges 522 from the silhouette image 624 and/or captured image 520. An edge angle can be identified by defining a first line between two adjacent pixels on the edges 522 and determining the angle of a second line normal to the first line relative to a reference line. The reference line can be stored in database 418.

Based on the edge angle, the computer system 410 can be programmed to determine if a line between adjacent pixels is horizontal, vertical, curved, convex, and/or concave. A horizontal surface can be defined as the top or bottom of the container 406. A middle point between the top and bottom of the container 406 can be defined as the vertical center of the container 406. A vertical surface can be defined as a side of the container 406. A middle point between the left side and the right side of the container 406 can be defined as the horizontal center of the container 406.

Figure 7:
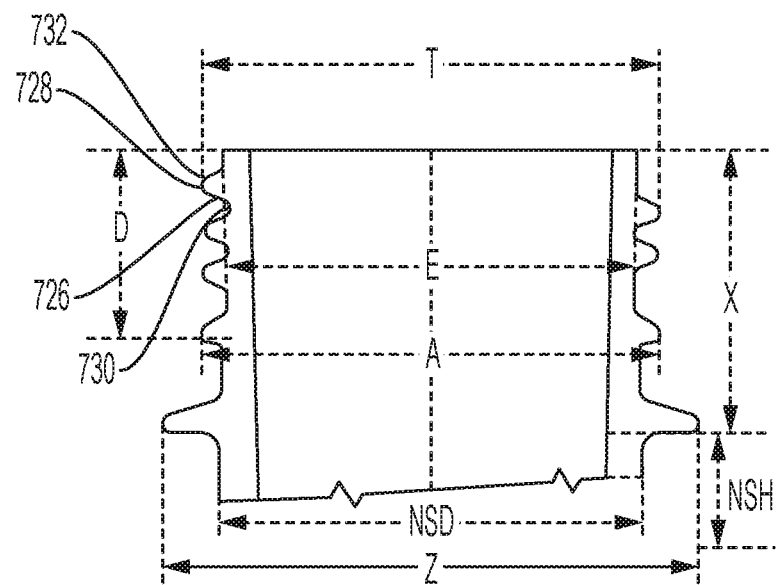
FIG. 7 is a detailed view of a silhouette image of a finish region of a container according to various embodiments of the present disclosure.

A curved, convex, and/or concave surface can be defined as a finish feature or other feature of the container 406. For example, the computer system 410 can be programmed to locate a concave region and/or a convex region on the edges 522 from the silhouette image 624 and/or the captured image 520. The concave region can correspond to a portion of the container 406 adjacent to a thread, between threads, adjacent to a support ledge, between a support ledge and a thread, and/or another feature. For example, a concave region 726 illustrated in FIG. 7 positioned between threads can be located by the computer system 410. Based on identification of the concave region 726 (and optionally a relative positioning on the container 406, such as, for example, a distance from the top of the container) a thread can be located and a crest and/or root of the thread can be identified. For example, as illustrated in FIG. 7, the crest 728 can be identified as adjacent to the concave region 726 and the root 730 can be identified as a point in the concave region. The root 730 can be the right most point in the concave region 726. Similarly, a convex region 732 can be identified and the left most point in the convex region 732 can be identified as the crest 728 and the root 730 can be identified as adjacent to the convex region 732.

The computer system 410 can be programmed to classify the features on the edges 522 into measurement categories. For example, each measurement category can correspond to a dimensional measurement that requires the location of that feature within the captured image 520 or the silhouette image 624. The dimensional measurement can be at least one of a container height (e.g., a distance between the top of the container and the bottom of the container); a container width (e.g., a distance between a left side of the container and the right side of the container); a tamper evident bead diameter (e.g., A, a distance between the crest of the feature adjacent to the support ledge on the left side and the crest of the feature adjacent to the support ledge on the right side); a tamper evident bead height (e.g., D, a distance between the bottom of a feature adjacent to the support ledge and the top of the container); a thread root diameter (e.g., E, a distance between the root of a thread on the left side of the container and the root of a thread on the right side of the container); a thread crest diameter (e.g., T, a distance between a crest of a thread on the left side of the container and a crest of a thread on the right side of the container); a height from a top of the container to a support ledge, X, a diameter of the support ledge (e.g., Z, distance between a left most point on the support ledge and a right most point on the support ledge); a neck straight diameter (e.g., NSD, a distance between a left most point on the neck of the container and a right most point on the neck of the container); and a neck straight height (e.g., NSH, a distance between the bottom of the neck and the bottom of the support ledge). For example, a top of the container feature can be classified into measurement categories for a tamper evident bead distance, D, and a height from a top of the container to a support ledge, X.

In other examples, the computer system 410 can be configured to measure thickness and material properties (e.g., composition, density) at any point or a continuous scan from the top of the container 406 to the bottom along the bottle centerline axis (e.g., substantially parallel with axis 412) in examples where the detector 402 is an infrared sensor, spectrometer, Hyperspectral camera, or confocal probe. The computer system 410 can be programmed to measure the color of the container 406 if the detector 402 is a color camera or spectrometer.

The computer system 410 can be programmed to determine dimensional measurements of the container from the features. For example, the computer system 410 can be programmed to determine a pixel distance between the features corresponding to the measurement. In various examples, the distance measurement can be sub pixel. The dimensional measurement can be a non-contact dimensional measurement.

The computer system 410 can be programmed to compare the dimensional measurements and other features measured from the detector 402 to the data store 418, which can comprise dimensional measurement job files or other data including thickness, color and material properties and associated specifications (e.g., a range for a particular dimension or property). Based on the comparison, the computer system 410 can identify the container 406 and be programmed to determine if the container 406 passes or fails the specification (e.g., falls within a range for that particular dimension).

The computer system 410 can be programed to define the regions of interest for the container 406 based on the features. For example, a region of interest for a tamper evident bead distance, D, could be defined to include a bottom of a feature adjacent to the support ledge and a top of the container. The region of interest can be defined to omit features, which may interfere with the desired dimensional measurement.

The computer system 410 can be configured to identify edges, locate features, and define regions of interest in a single captured image or at least two captured images. For example, the computer system 410 can be programmed to combine at least two captured images together into a combined image of at least a portion of the container. The at least two captured images may have been captured at substantially the same angle of the platform relative to the detector 402 and different elevations of the platform 404 relative to the detector 402.

Figure 8:
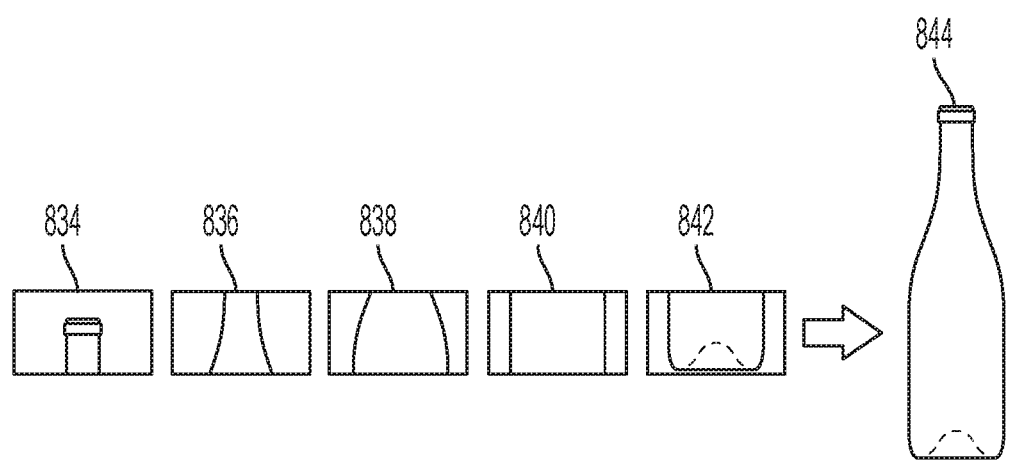
FIG. 8 is a diagram illustrating multiple images that are combined into a single combined image according to various embodiments of the present disclosure.

For example, referring to FIG. 8, a first image 834, a second image 836, a third image 838, a fourth image 840, and a fifth image 842 have been captured of container 406 by the detector 402. The images, 834, 836, 838, 840, and 842 are output to the computer system 410 where they are combined into a single combined image 844 using pose data embedded in each image or stored in the data store 418. Also, the images, 834, 836, 838, 840 can be combined using pose data into a single silhouette image reducing the memory required to store the complete shape of the container.

Figure 11:
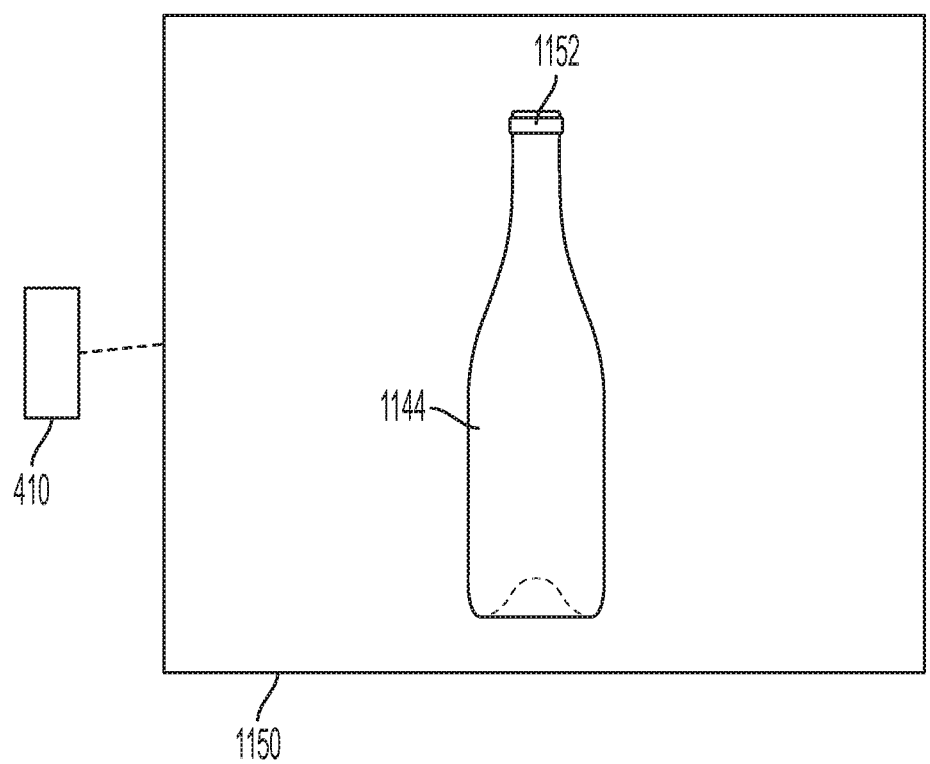
FIG. 11 is a block diagram illustrating a computer system operatively coupled to a display presenting a virtual representation according to various embodiments of the present disclosure.
Figure 12:
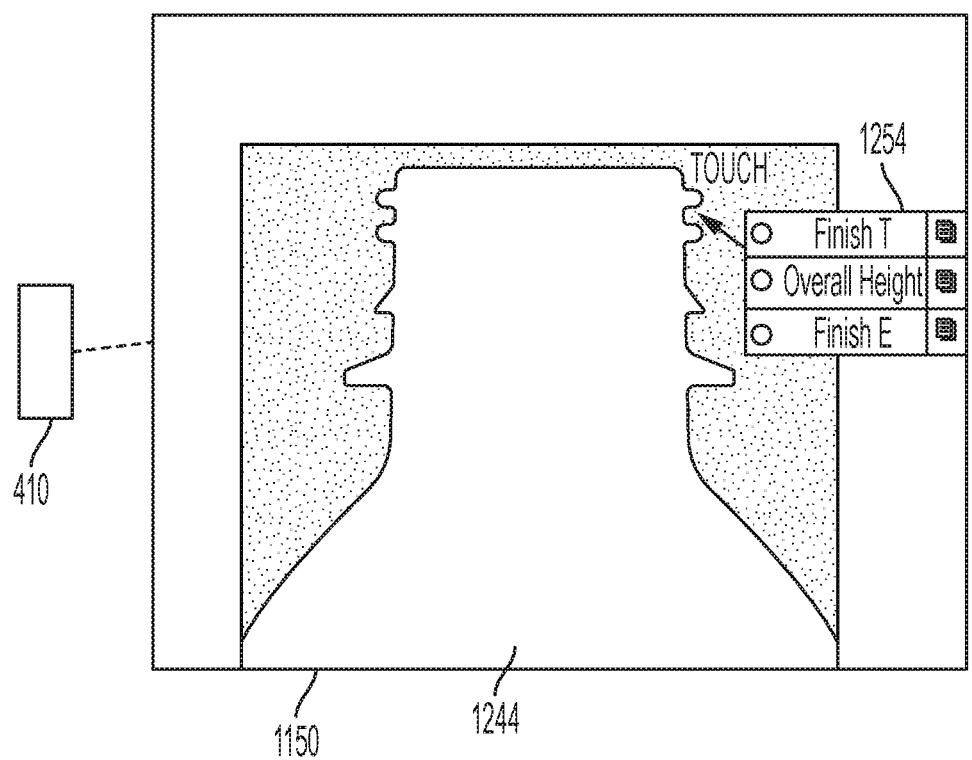
FIG. 12 is a block diagram of the computer system and display of FIG. 11, wherein the display is presenting a second virtual representation.
Figure 13:
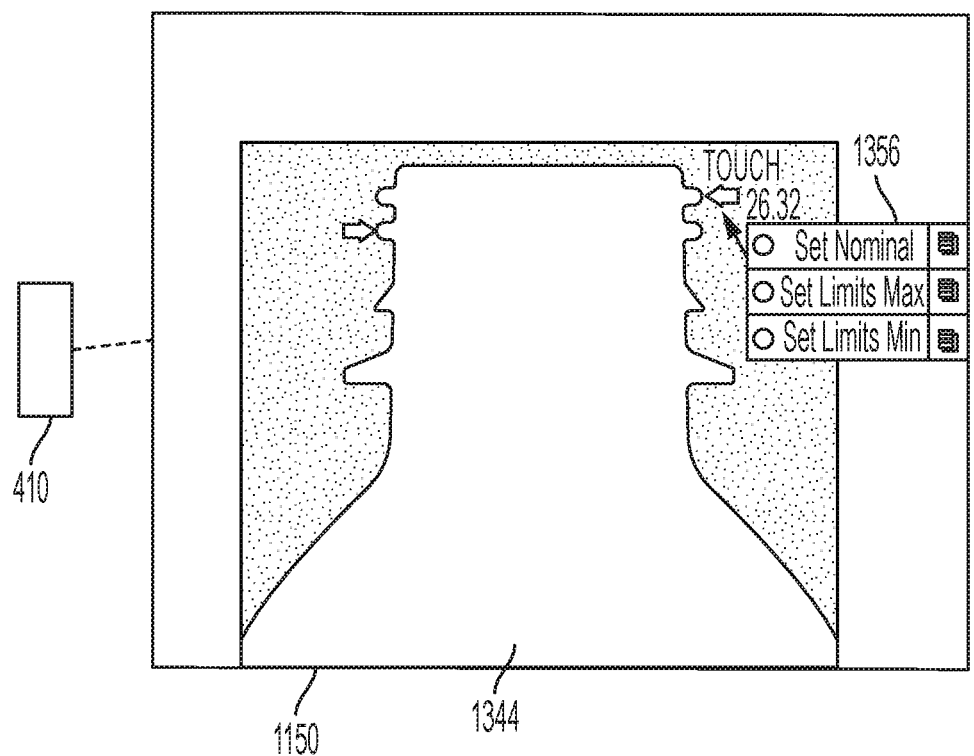
FIG. 13 is a block diagram of the computer system and display of FIG. 12, wherein the display is presenting a third virtual representation.

In various embodiments, the computer system 418 can be in communication with a display 1150 as shown in FIG. 11. The display 1150 can be, for example, a touch screen display. The single combined image 844 or other profile/silhouette data file can be a 3-Dimensional (3D) representation of the container 406, such as, for example, a point cloud or 3D image file. The computer system 410 can be configured to present a virtual representation 1144 of the single combined image 844 on the display 1150 and, optionally, annotate features on the surface of the virtual representation 1144, such as dimensional variation, thickness, color, material properties, and/or error between nominal values and actual values throughout the virtual representation 1144 of the container 406. For example, responsive to the user clicking via an input device (e.g., mouse) or touching (in the case of a touch screen display) a select location on the virtual representation 1144, such as, for example, location 1152 on the display 1150 corresponding to the finish features of the container 406, the computer system 410 can present the virtual representation 1244 as illustrated in FIG. 12 on the display 1150. The virtual representation 1244 can be annotated with a box 1254 presenting various parameters (e.g., dimensional measurements, pass/fail thresholds) and/or options the user can select, such as, for example, Finish T, overall Height, and Finish E as displayed in FIG. 12. Thereafter, the user can select any one or more of those measurements to be added to a job file in the data store 418 associated with the container 406. The computer system 410 can be programmed to store the nominal value for measurements based the output from the detector 402 scanning the container 406 presented on the platform 404.

For example, the user can select "Finish T" and the virtual representation 1344 can be displayed by the computer 410 on the display 1150. The virtual representation 1344 can include annotations of arrows to highlight which features on the container 406 are being used by the computer system 410 to compute the selected dimensional measurement, and a value for the measurement (i.e., 26.32) can be displayed. Additionally, another box 1356 can be displayed which can be used by the user to set various parameters in the job file in the data store 418.

In other examples, the location of the minimum and/or maximum point for each dimension within the region of interest around the container 406 can be displayed on the virtual representation 1144, 1244, 1344. The computer system 410 can allow the operator to adjust the pose and/or magnification of the virtual representation 1144, 1244, 1344. For example, the operator can rotate the virtual representation 1144, 1244, 1344 about any of the 3 axis of the respective virtual representation 1144, 1244, 1344 associated with the container 406.

The computer system 410 can be programmed to compare the features identified in captured images to the data store 418, which can comprise stored feature data. Based on the comparison, the computer system 410 can be programmed to select a region of interest within the captured images. In other embodiments, the computer system can be programmed to compare the silhouette in captured images to the data store 418, which can comprise a stored nominal silhouette and based on the comparison, the computer system 410 can be programmed to select a region of interest and/or measurements within the captured images.

In various examples, the system 400 can comprise a robot system 446. The robot system 446 can be programmed to grip the container 406 based on a comparison of the identified features to the data store 418 and/or based on dimensional measurements determined from identified features in the captured images. The robot system 446 can be programmed to grip the container 406 by identifying features of the container 406 in real time and comparing the identified features and/or dimensional measurements to the data store 418. Thus, the robotic system 446 can automatically handle and transport the container 406 as desired without the operator having to input handling and transport commands to the robot system 446.

Figure 9:
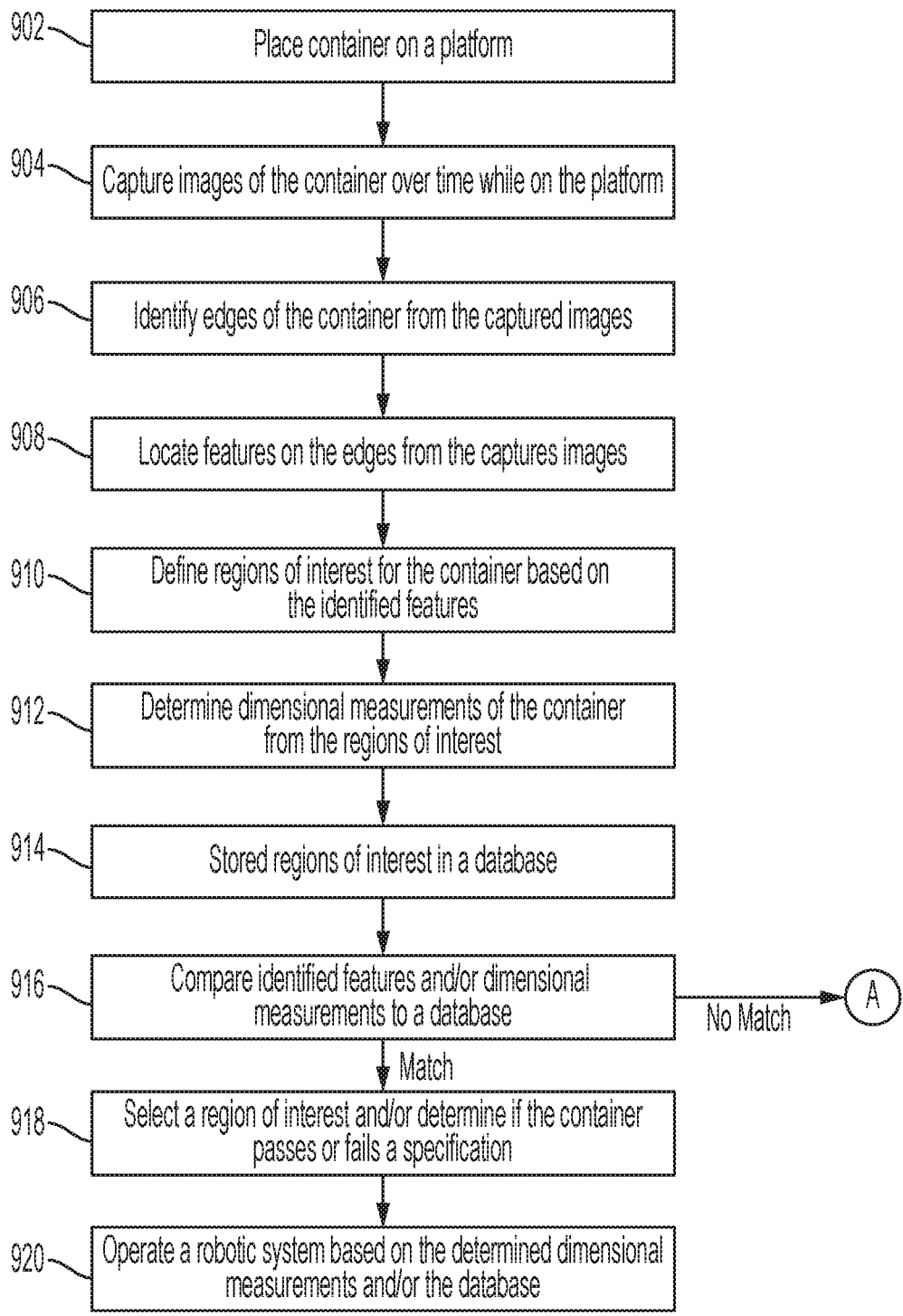
FIG. 9 is a flow chart illustrating a method for autonomously defining regions of interest for a container according to various embodiments of the present disclosure.

A method for determining regions of interest for a container according to various embodiments of the present invention is illustrated in FIG. 9. The method can comprise, at step 902, placing the container 406 on a platform 404. In various examples, the container can be formed with a container forming machine in a production run and the container placed on the platform can be from the production run. At step 904, the detector 402 can capture images of the container 406 over time while on the platform 404. There can be relative movement between the platform 404 and the detector 402, such that images captured by the detector 402 are of different container poses relative to the detector 402. In various examples, at least two of the captured images can be combined together into a combined image of at least a portion of the container.

At step 906, the computer system 410 can identify edges of the container from the captured images and, at step 908, locate features on the edges from the captured images. At step 910, the computer system 410 can define regions of interest for the container based on the identified features and, at step 912, the computer system 410 can determine dimensional measurements of the container 406 from the regions of interest. At step 914, the computer system 410 can store the regions of interest, e.g., coordinates in the image of the container that define the region of interest, in the data store 418. The data store 418 may be stored in-memory, on the cloud, on a server (e.g., a SQL server), etc.

The identified features, determined dimensional measurements of the container 406, and/or material properties can be compared to the data store 418 including job files in the data store 418. If a threshold level of similarity between a job file and the features, dimensional measurements, and/or material properties is determined based on the comparison, the job file with the threshold level of similarity can be designated as a match to the container 406 being measured. Thereafter, the computer system 410 can, at step 918, select a region of interest within the captured images based on a region of interest associated with the matching job file and/or to determine if the container passes or fails the specification based on pass/fail thresholds in the matching job file. In various examples, at step 920, a robotic system can grip the container based on parameters associated with the matching job file. Additionally, parameters of the system 400 can be adjusted based on the matching job file in order to enhance the accuracy of the determination of the dimensional measurements. For example, the system 400 can import the correct system parameters which define the light power, transport speed or gripping force, or have job change parts installed or moved by automated actuators based on the matching job file.

Figure 10:
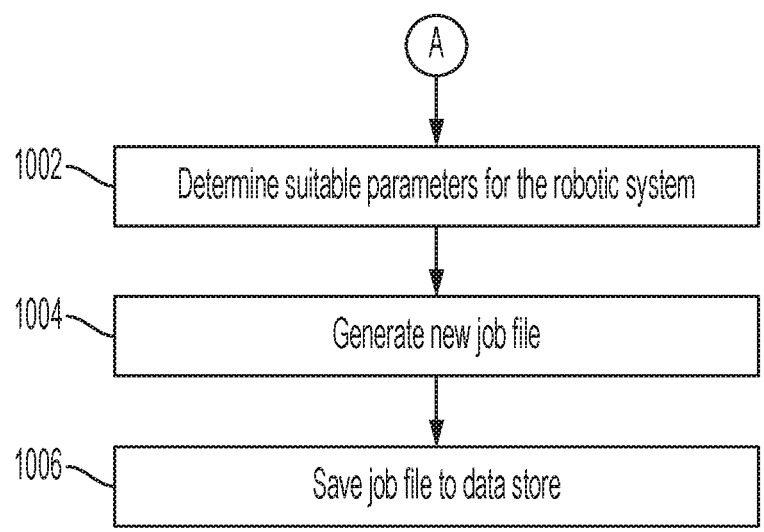
FIG. 10 is a flow chart illustrating a method for autonomously identifying the container based on comparison of ROI measurements and other features in a data store.

Referring to FIG. 10, if a threshold level of similarity between a job file and the features is not achieved at step 916, the computer system 410 can determine suitable parameters for the robotic system to grip the container based on the output from the detector, 1002. For example, the computer system 410 can determine suitable parameters for container transport and/or job change part adjustment and/or region of interests and/or dimensions to be measured and generate a job file based on those suitable parameters, 1004. The computer system 410 can save the job file to the data store for future comparisons. In some embodiments, the computer system 410 can have a set of template files with Pass/Fail limits and the computer system 410 can match the features, dimensions and/or regions of interest of the container determined from the detector 402 to the list of template files in order to rapidly and/or accurately generate the job file with the correct parameters autonomously.

The functionality of the computer system 410 described herein may be implemented with software that is stored in computer memory and executed by a processor(s) of the computer system 410. The software may use any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

The processor(s) of the computer system 410 may comprise onboard memory (ROM or RAM) and offboard memory. The onboard memory may comprise primary, volatile, and/or non-volatile storage (e.g., storage directly accessible by the processor cores). The offboard memory may comprise secondary, non-volatile storage (e.g., storage that is not directly accessible by the processor cores), such as ROM, HDDs, SSD, flash, etc. The processor cores may be CPU cores and/or GPU cores, for example. The software that is executed by the processor(s) to perform the above-described functions of the computer system may be stored in the offboard and/or onboard memory described above.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussions are intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A system for autonomously defining regions of interest for a container, the system comprising:
    a detector for capturing feature data of the container; and
    a computer system in communication with the detector, wherein the computer system is programmed to:
        identify edges of the container from the captured feature data, including transforming the captured feature data into a silhouette of the container;
        locate features on the edges of the container including to identify an edge angle attribute along the edges from the silhouette of the container;
        classify the features on the edges of the container into measurement categories based on the edge angle attribute and location of the features; and
        define the regions of interest for a dimensional measurement of the container based on the located features, including determining which located features to include in the region of interest based on the measurement category.

2. The system of claim 1, wherein the computer system is programmed to utilize at least one of chain code, raster scanning, Sobel edge detection, thresholding, and edge extraction to locate features on the edges of the container.

3. The system of claim 1, wherein the computer system is programed to locate features on the edges of the container comprises the computer system programmed to locate at least one of a concave region and a convex region from the captured feature data.

4. The system of claim 1, wherein the features comprise at least one of a horizontal center of the container, a vertical center of the container, a top of the container, a side of the container, a bottom of the container, a finish feature, a body feature, a shoulder feature, and a heel feature.

5. The system of claim 4, wherein the finish feature comprises at least one of a thread crest, a thread root, a support ledge edge, and a neck straight edge.

6. The system of claim 1, further comprising a platform to support the container.

7. The system of claim 6, further comprising a light source, wherein the platform is positioned intermediate the light source and the detector.

8. The system of claim 6, wherein the platform is configured to rotate about an axis and change elevation relative to the detector.

9. The system of claim 6, wherein the detector is configured for capturing images of the container over time while on the platform, wherein there is relative movement between the platform and the detector, such that feature data captured by the detector is of different container poses relative to the detector.

10. The system of claim 9, further comprising the computer system programmed to combine at least two of the captured images together into a combined image of at least a portion of the container.

11. The system of claim 10, wherein the at least two images were captured at substantially the same angle of the platform relative to the detector and different elevations of the platform relative to the detector.

12. The system of claim 1, further comprising:
    a display in communication with the computer system, wherein the computer system is configured to display a virtual representation of the feature data of at least a portion of the container on the display.

13. The system of claim 12, wherein the computer system is further configured to annotate the virtual representation with a parameter associated with the container.

14. The system of claim 12, wherein the computer system is configured to change at least one of the pose and magnification of the virtual representation responsive to received input.

15. The system of claim 1, further comprising the computer system programmed to compare the features to a data store of features and select a region of interest based on the comparison.

16. The system of claim 15, further comprising a robotic system, wherein the robotic system is programmed to grip the container based on the comparison.

17. The system of claim 1, wherein the computer system is programmed to determine dimensional measurements of the container from the features.

18. The system of claim 17, further comprising a robotic system, wherein the robotic system is programmed to grip the container based on the determined dimensional measurements.

19. The method of claim 1, wherein the detector is at least one of a camera, an infrared sensor, a spectrometer, a confocal probe, LIDAR, and a thickness sensor.

20. The method of claim 1, wherein the detector is a camera and the captured feature data is an image.

21. A method for autonomously defining regions of interest for a container, the method comprising:
    capturing, by a detector, feature data of the container;

identifying, by a computer system, edges of the container from the captured feature data, including transforming the captured feature data into a silhouette of the container;

locating, by the computer system, features on the edges of the container including identifying an edge angle attribute along the edges from the silhouette of the container;

classifying, by the computer system, the features on the edges of the container into measurement categories based on the edge angle attribute and location of the features; and defining, by the computer system, the regions of interest for a dimensional measurement of the container based on the features, including determining which located features to include in the region of interest based on the measurement category.

22. The method of claim 21, further comprising storing the regions of interest in a data store.

23. The method of claim 21, further comprising forming containers with a container forming machine in a production run.

24. The method of claim 23, further comprising:
determining, by the computer system, dimensional measurements of the container from the features; and
comparing dimensions of containers formed in the production run to a specification for the container using the regions of interest stored in the data store.

25. The method of claim 21, further comprising:
capturing, by the detector, images of the container over time while on a platform, wherein there is relative movement between the platform and the detector, such that images captured by the detector are of different container poses relative to the detector; and
combining at least two of the captured images together into a combined image of at least a portion of the container.

26. A system for autonomously defining regions of interest for a container, the system comprising:
a detector for capturing feature data of the container; and
a computer system in communication with the detector, wherein the computer system is programmed to:
identify edges of the container from the captured feature data, including transforming the captured feature data into a silhouette of the container;
locate features on the edges of the container, including identify an edge angle along the edges from the silhouette of the container; and
define the regions of interest for a dimensional measurement of the container based on the edge angle and location of the features.

27. The method of claim 26, wherein the edge angle is identified by defining a first line between two adjacent pixels on the edges and determining an angle of a second line normal to the first line relative to a reference line.

* * * * *